March 21, 1967  L. C. FRAZIER  3,310,093
RESTRICTIVE TREAD COMPONENT FOR PNEUMATIC TIRES
Filed May 21, 1965  4 Sheets-Sheet 1
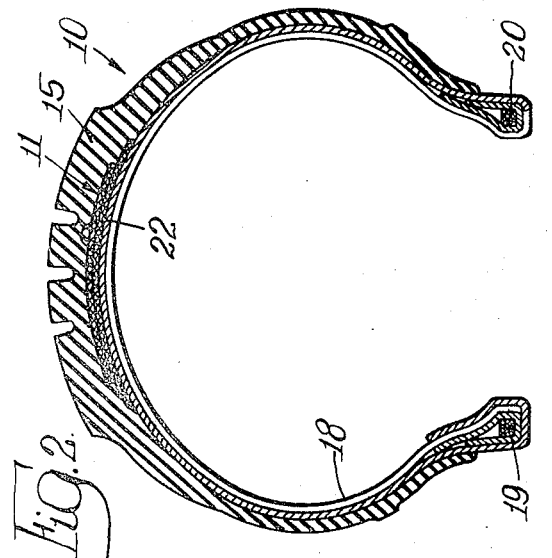
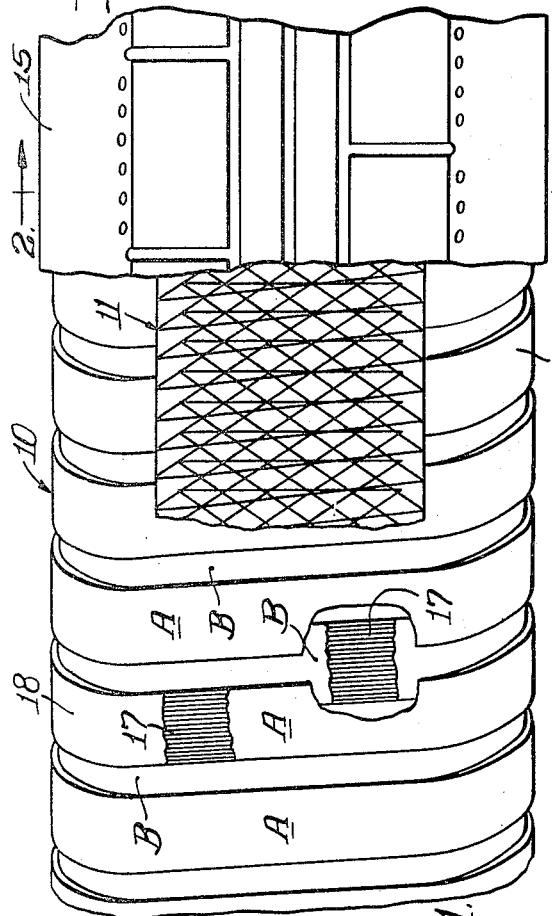
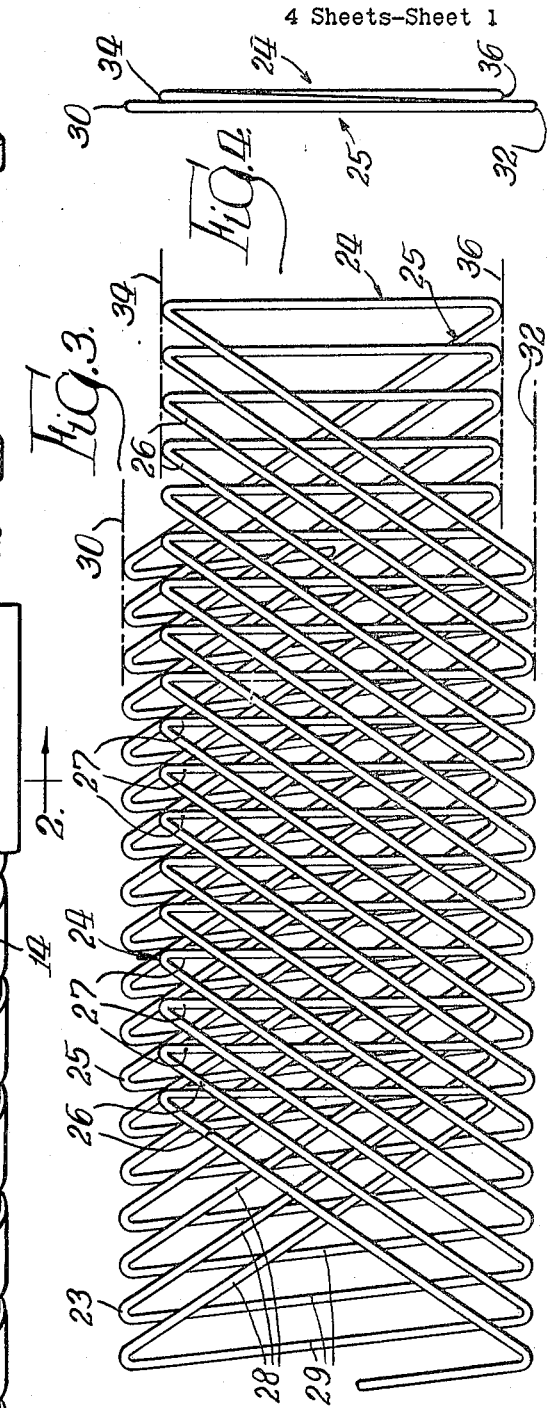
Inventor:-
Larry C. Frazier,

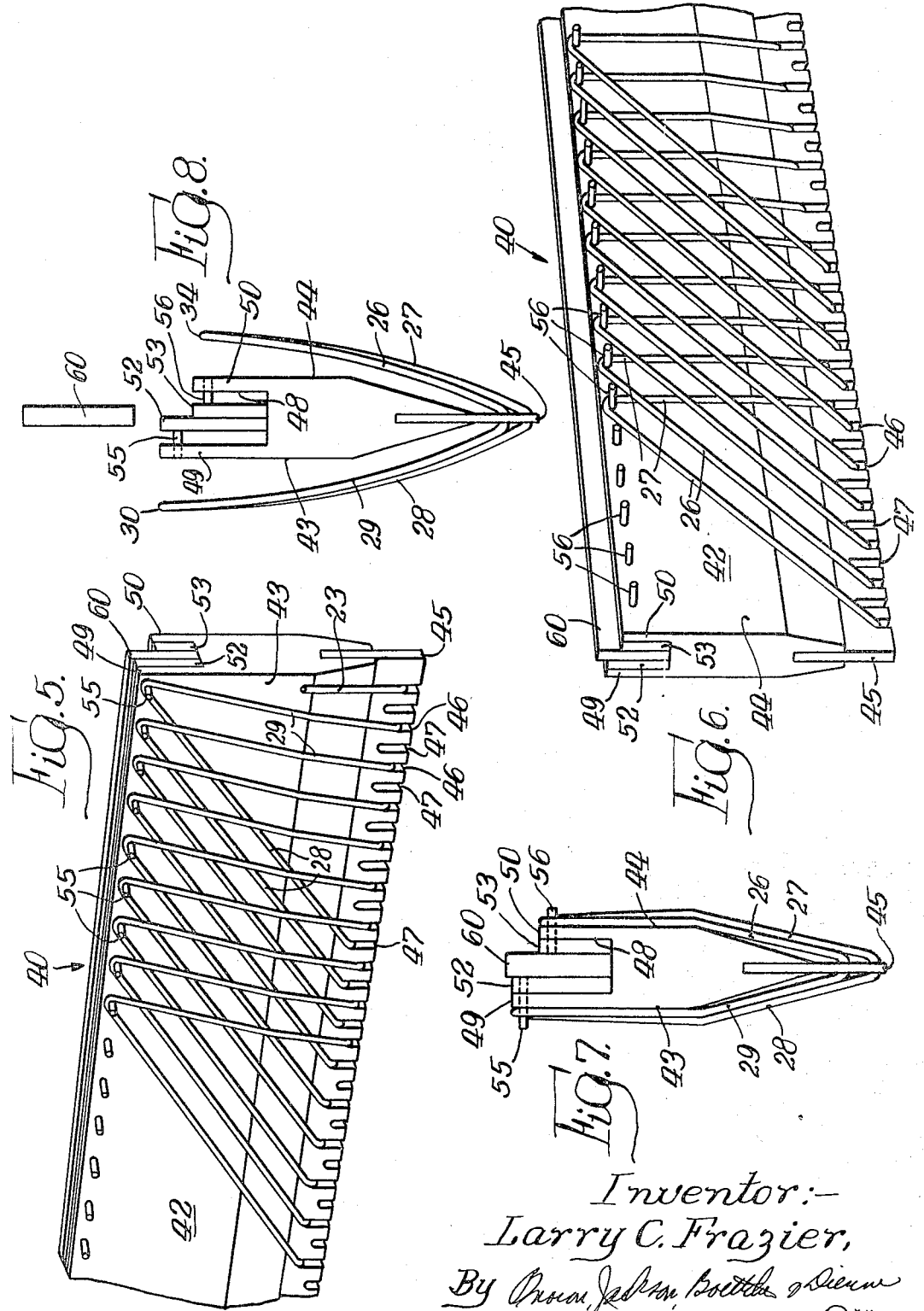

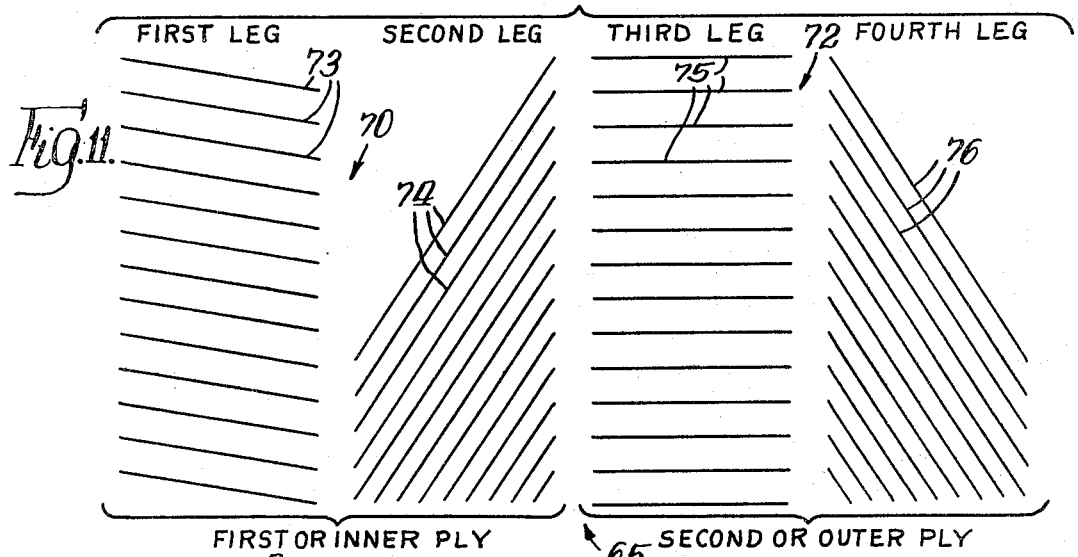
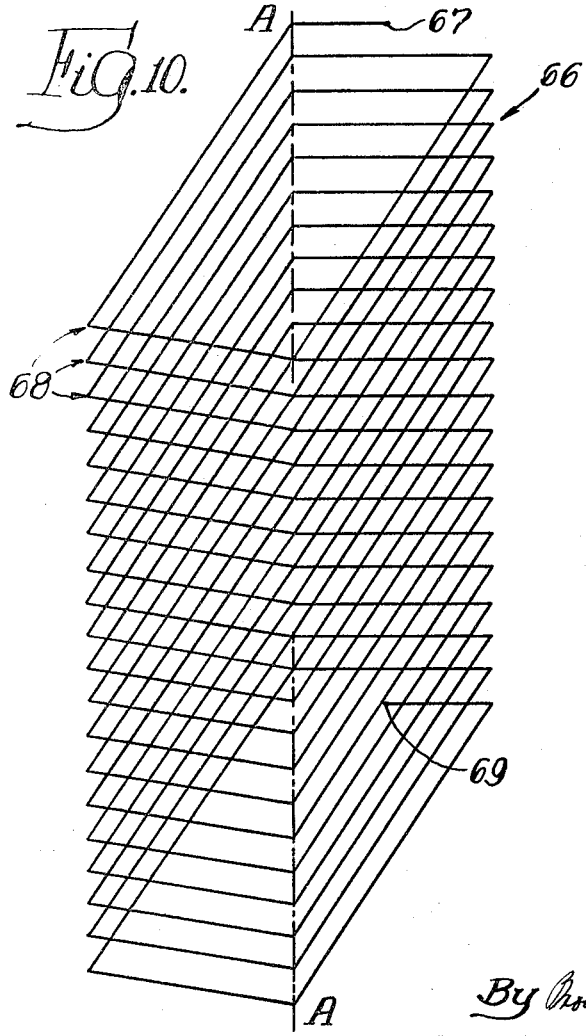
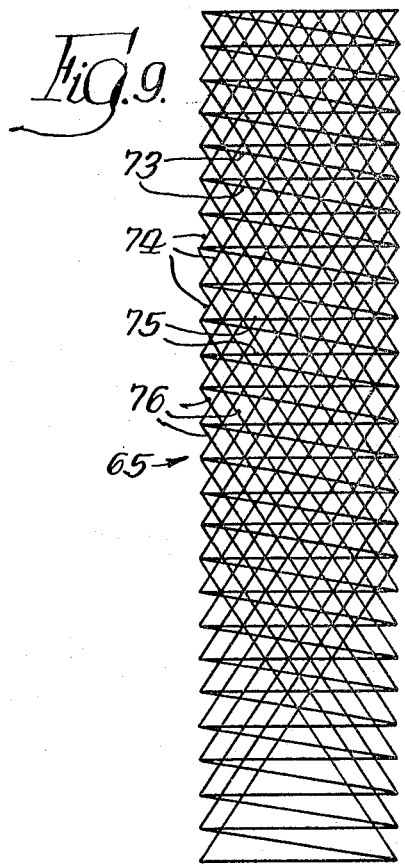

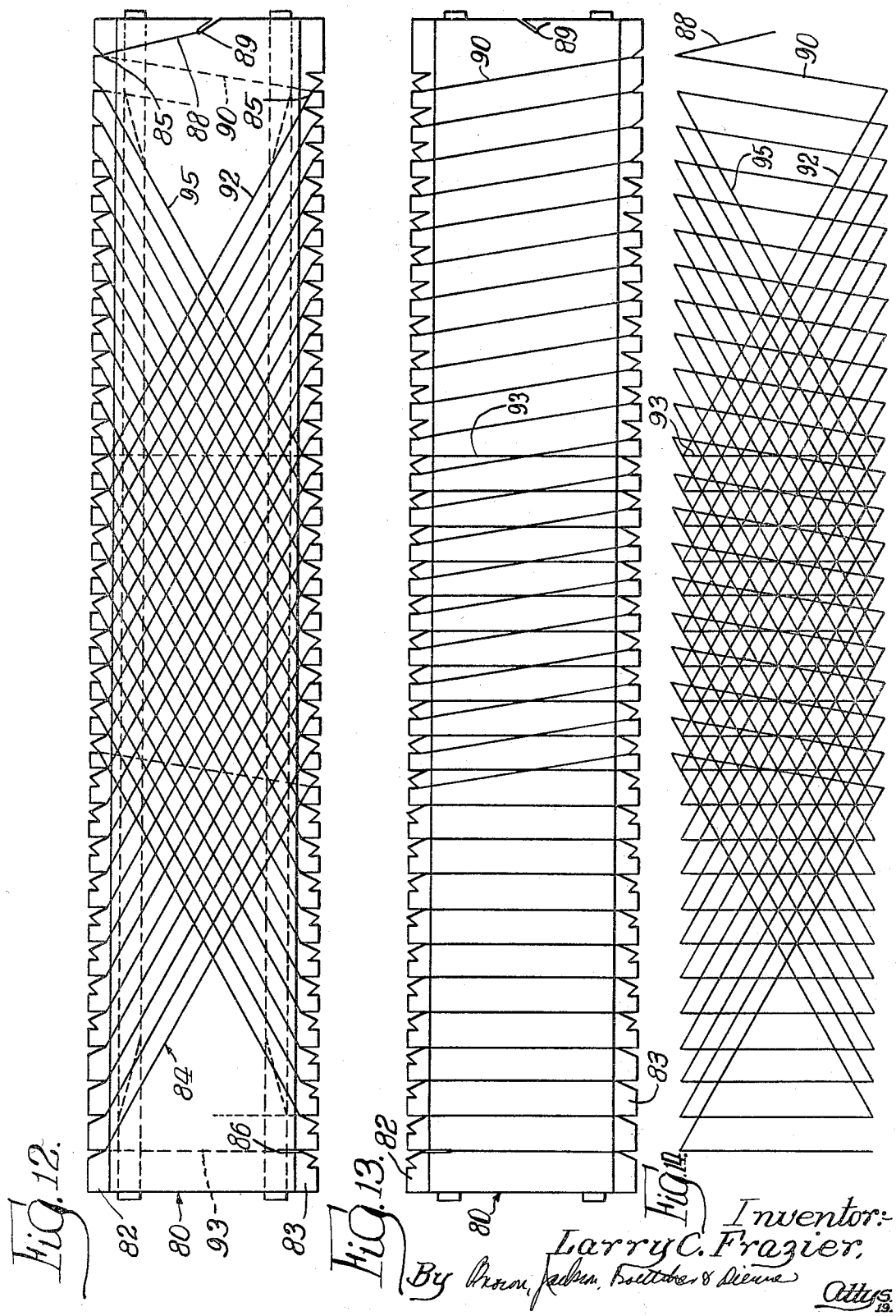

United States Patent Office 3,310,093
Patented Mar. 21, 1967

3,310,093
RESTRICTIVE TREAD COMPONENT FOR
PNEUMATIC TIRES
Larry C. Frazier, Prescott, Ariz., assignor to National-Standard Company, Niles, Mich., a corporation of Delaware
Filed May 21, 1965, Ser. No. 457,718
11 Claims. (Cl. 152—361)

The present invention relates to restrictive tread components or cincture structures for use between the carcass and tread of a pneumatic tire.

Restrictive tread components or cincture structures are employed in the tire art to prevent tire carcass growth and provide desired road engagement characteristics of the tread of the tire. The utilization of such restrictive tread components is highly desirable in a radial or zero angle tire which is characterized by having a carcass reinforced by cords lying in planes extending radially outwardly or substantially so of the axis of rotation of the tire. While the restrictive tread components of the present invention have particular utility in radial angle tires, they may also be used in conventional tires having carcasses formed from bias cut carcass building materials.

It is known in the art to provide restrictive tread components composed of one or more separate plies each comprising continuous reinforcing cord means lying in a plurality of circumferentially successive and serially connected overlapping convolutions of various configurations such as circular, triangular and diamond. In such known restrictive tread components, the convolutions may be readily distorted and fail to adequately prevent tire growth and effective support to provide desired tread road engaging characteristics. Further, in such known arrangements of a plurality of plies, the plies must be applied individually to the carcass of a tire and cannot be conveniently assembled as a unit with the carcass.

It is an object of the present invention to avoid the aforenoted disadvantages of known constructions by providing a restrictive tread component comprising, in effect, two or more annular plies disposed in superposed relation and formed from continuous reinforcing cord means, and in which such cord means in each of the plies lie in positions with respect to each other to effectively prevent tire carcass growth and afford desired road engaging characteristics of the tire tread.

The above and other objects and advantages of the invention will appear from the following detailed description of certain preferred embodiments of the invention.

Now in order to acquaint those skilled in the art with the manner of constructing and utilizing restrictive tread components in accordance with the principles of the present invention, there shall be described in connection with the accompanying drawings certain preferred embodiments of the invention.

In the drawings:

FIGURE 1 is a plan view of a portion of a pneumatic tire broken away to show one form of restrictive tread component of the invention embodied between the carcass and tread of the tire;

FIGURE 2 is a vertical sectional view of the tire of FIGURE 1 with the view being taken substantially along the line 2—2 of FIGURE 1 looking in the direction indicated by the arrows;

FIGURE 3 is a plan view showing a portion of the restrictive tread component embodied in the tire of FIGURES 1 and 2;

FIGURE 4 is an end elevational view of the restrictive tread component of FIGURE 3;

FIGURE 5 is a perspective end view showing one side of a mandrel for forming the restrictive tread component of FIGURES 3 and 4;

FIGURE 6 is a perspective end view showing primarily the other side face of the mandrel of FIGURE 5;

FIGURE 7 is an end view of the mandrel with reinforcing cord material wound thereon in the closed position of the mandrel;

FIGURE 8 is an end view of the mandrel with the parts in position for removing the restrictive tread component formed thereon;

FIGURE 9 is a plan view of a restrictive tread component according to another embodiment of the invention;

FIGURE 10 is a view showing the first step in laying of reinforcing cord means to form the restrictive tread component of FIGURE 9;

FIGURE 11 is a diagrammatic exploded view showing the direction of lay of the reinforcing cord material of the restrictive tread component of FIGURE 9;

FIGURE 12 is a diagrammatic plan view of the front side of a mandrel having cord reinforcing material wound thereon in constructing a restrictive tread component according to still another embodiment of the invention;

FIGURE 13 is a plan view of the back side of the mandrel of FIGURE 12 and showing the lay of the cord reinforcing material thereat; and FIGURE 14 is a plan view of the restrictive tread component formed on the mandrel of FIGURES 12 and 13.

Referring now to FIGURES 1 and 2 of the drawings there is shown a pneumatic tire 10 embodying a restrictive tread component 11 according to one embodiment of the present invention lying between the crown of the carcass 14 and the tread 15 of the tire. The carcass 14 may be of any known construction and may, for example, be of the so-called radial or zero angle construction characterized by being reinforced by cord means 17 lying in planes extending radially outwardly or substantially so of the axis of rotation of the tire. The reinforcing cord means 17 of the carcass may be formed of any desired natural or synthetic fibers or materials such as cotton, nylon, rayon and fiber glass or metals, or combinations of such fibers and materials, and may comprise mono-filament or multi-filament strands twisted or stranded together and, if desired, such strands may also, in turn, be reinforced. Further, the reinforcing cord means 17 may be coated or insulated with raw rubber or the like or uncoated as may be desired. Additionally, the reinforcing cord means 17 may, if desired, be of the cord or rope construction of United States Patent No. 3,133,584, dated May 17, 1964, to Ernest U. Lang and issued to the assignee of the present application. The particular carcass shown in FIGURES 1 and 2 is constructed in accordance with the principles of the invention of my co-pending application Ser. No. 374,331, filed June 11, 1964, now Patent No. 3,240,250 and to which application reference may be had for a full and complete description of the illustrated tire carcass. The particular carcass shown is formed from continuous raw rubber carcass strip material 18 reinforced by the lengthwise extending reinforcing cord means 17, as shown in FIGURE 1.

The carcass 14 embodies a pair of conventional bead rings 19 and 20 disposed in spaced apart relation axially of the rotational axis of the tire 10. The strip material 18 extends in circumferentially successive outer and inner layers A and B, respectively, between the bead rings 19 and 20 to form a substantially torus body. The strip material 18 for the carcass preferably is uninterrupted beginning with one free end and continuing to its other end so that there are but two ends of the material in the completed torus body. The strip material 18 extends radially outwardly of and between the bead rings 19 and 20 in circumferentially successive first outer layers A which may be considered as extending from the center line of the inner periphery of the bead ring 19 to the center line of the inner periphery of the bead ring 20 at a first slight angle as, for example, of the order of 2°, to a plane extending radially outwardly from the axis of rotation $x$—$x$ of the tire, and in circumferentially successive second inner layers B in superposed relation with respect to layers A, and which layers B may be considered as extending from the center line of bead ring 20 to the center line of the inner periphery of bead ring 19, again at a second slight angle of the order noted to the aforementioned radial plane but in the opposite direction to the angle of the first outer layers A. The torus body thus defined by layers A and B has a crown portion indicated at 22 lying radially outwardly of the bead rings 19 and 20 and inwardly of the inner surface of tread 15 of the tire.

It is preferable in constructing the above carcass to abut adjacent side edges of the strip material 18 of circumferentially successive outer and inner layers A and B, respectively, at the bead rings. In such relationship of the strip material and with the material being layed at the angle afore-indicated, the adjacent opposed side edges of circumferentially successive outer layers A and B diverge away from each other in a direction extending from the bead rings toward the crown of the carcass. The carcass above described is thus of the nature of a variation or modification of a zero or radial angle tire although departing from the latter in its true form in that in the true radial or zero angle tire the reinforcing cords lie in true planes extending radially outwardly of the axis of the tire. It will be understood that the restrictive tread components of the present invention have utility for use with radial angle tires or variations thereof other than as above described as well as in any tire structure in which it is desirable to restrict or control tire growth and for effecting desired road engaging characteristics of the tire tread.

In constructing the aforementioned tire, a carcass as described as above has the restrictive tread component 11 of the present invention formed into annular configuration and arranged to lie between the crown of the carcass and the adjacent inner surface of the tread 15.

The restrictive tread component 11 may be formed of reinforcing cord means 23 composed of any of the aforedescribed materials for fabricating the reinforcing cord means 17 for the carcass of the tire. The tread component 11, as best seen in FIGURES 3 and 4, comprises an outer ply 24 and an inner ply 25 which, as will be described, are formed from a continuous length of cord reinforcing material 23. The cord reinforcing material 23, is layed, as hereinafter described in an outer ply 24 defined by a plurality of successive parallel first leg portions 26 extending diagonally transversely of the tread component and from each which a plurality of successive parallel second leg portions 27, respectively, extend transversely of the tread component, but at a different angle than the first leg portions, and an inner ply 25 defined by a plurality of successive parallel third leg portions 28 extending each from the second leg portions 27, respectively, of the outer ply 24 diagonally transversely of the tread component and in a direction opposite that of and in crossing relation with the first leg portions 26, and a plurality of successive parallel fourth leg portions 29 also extending from each the third leg portions 28, respectively, transversely of the tread component but at a different angle than the third leg portions 28. It will be noted that the first and third leg portions 26 and 28 are of the same length and that the second leg portions 27 are of less length than the fourth leg portions 28 with the arrangement being such as to provide the inner ply 25 with an outer side edge 30 and the outer ply 24 with an outer side edge 32 with said outer side edges 30 and 32 lying laterally outwardly of the opposite side edges 34 and 36 of the outer and inner plies 24 and 25, respectively. It will be seen that the second and fourth leg portions 27 and 29 extend slightly angularly toward each other from the side edge 34 toward the side edge 32 and vary slightly from a normal relationship with respect to such side edges.

A suitable length of cord reinforcing material 23 is layed in the manner above described to provide, when arranged in annular configuration, a restrictive tread component between the carcass and tread of the tire as above described. It will be noted that the right hand end of the layed material is arranged so as to be disposed in mating relation with the material at the left hand end so as to provide for a disposition of the several leg portions of the inner and outer plies with respect to each other uniformly circumferentially of the carcass of the tire. In forming the component into annular configuration it will be seen that the first leg portions 26 of the outer ply 24 and the third leg portions 28 of the inner ply 25 will extend in opposite directions of the circumference of the carcass of the tire, and that the second leg portions 27 and the fourth leg portion 29 will extend transversely of the crown of the carcass and lie in slightly offset relation with respect to radial planes passing through the rotational axis of the tire. It will be further observed that the offset edges 30 and 34 and 32 and 36 provide, in effect, an offset step at opposite side edges of the inner and outer plies, simulating the incorporation of two plies of different widths in the tire.

In FIGURES 5 through 8 there is shown a mandrel 40 upon which the restrictive tread component 11 may be fabricated or formed. As shown in the figures referred to, the mandrel 40 comprises a body member 42 having front and back surfaces 43 and 44, respectively, tapering toward each other and which body member at its lower lengthwise edge has a notched bar 45 suitably mounted thereat. The bar 45 along its lower edge is formed with alternate and uniformly lengthwise spaced apart notches 46 and 47 with the notches 47 being of greater depth than the notches 46. The body member 42 along its upper lengthwise edge is formed with a channel 48 of substantially U-shaped in cross section defined by front side wall 49 and a rear side wall 50. The side wall 50 is of less height than the front side wall 49. A first or front pin bar 52 lies in channel 48 inwardly of the front side wall 49, and a second or rear pin bar 53 lies in channel 48 inwardly of the rear side wall 50. The first or front pin bar 52 carries a plurality of pins or pegs 55 uniformly spaced apart lengthwise thereof and which are adapted to project laterally outwardly through front side wall 49. The second or rear pin bar 53 also carries a plurality of pins or pegs 56 uniformly spaced apart lengthwise thereof and in lengthwise staggered or offset relation with respect to pins 55 of the first or front pin bar 52. Also, the pins 56 of the second or rear pin bar 53 lie in a plane below the plane of the pins 55 of the first or front pin bar 52 in an amount equal to the difference in depth of notches 46 and 47. A movable wedge bar 60 is provided and may be disposed lengthwise between the front and rear pin bars 52 and 53 and in such position the pins 55 and 56 extend, respectively, laterally outwardly of the front and rear surfaces of the body member 42. Upon removal of wedge bar 60 the front and rear pin bars 52 and 53 may be moved laterally toward each other within channel 48 to draw pins 55 and 56 inwardly of the front and rear surfaces 43 and 44, respectively, of body member 42.

With a mandrel as above described, cord reinforcing material 23 may have the leading edge portion thereof disposed opposite the front wall 43 of body member 42 in alignment with the first shallow notch 46 in the notch member 45 through which the material 23 is then passed to the back surface of the mandrel as shown in FIGURE 6 and diagonally transversely of the back surface 44 to a selected pin 56 providing the desired angular relationship of lay of the cord reinforcing material to define the aforedescribed first leg portion 26 of the outer ply 24 shown in FIGURE 3. The cord reinforcing material is then extended transversely of the back surface 44 to a notch 47 substantially normally disposed to the pin 56 to define the second leg portion 27 of the aforedescribed restrictive tread component. The cord reinforcing material is then extended from the last mentioned notch 47 as shown in FIGURE 5 in a direction to traverse the front face 43 of the mandrel to define the aforedescribed third leg portion 29 to the end pin 55 at the forward end of the mandrel, and then from such end pin 55 to the next succeeding shallow notch 46 of the notch bar 45 to define the fourth leg portion 29 of the restrictive tread component shown in FIGURE 3. The reinforcing material is then continuously layed in the manner described alternately between the notches and pins 55 and 56 from the forward end of the mandrel to the rearward end of the mandrel in the manner described. Upon completion of the laying of the cord reinforcing material, the wedge bar 60 is removed from between the front and rear pin bars moving the pins 55 and 56 inwardly and away from the front and rear surfaces of the body member 42 to enable removal of the formed cord reinforcing material. Upon removal of the wound material from the mandrel it is then shaped into annular configuration with the opposite ends in mating relation and thus provide the restrictive tread component 11 as shown in FIGURE 3. The mandrel may be of sufficient length to provide the desired end annular ply or if desired a plurality of shorter ply sections may be assembled in mating relation in forming the full ply.

Upon reference now to FIGURES 9 through 11, there is shown at 65 another restrictive tread component according to the present invention. The restrictive tread component 65 is formed from reinforcing cord means 66 composed of any of the aforementioned materials for cord reinforcing means 17 and 23. As best seen in FIGURE 10, cord reinforcing means 66 is layed starting at point 67 in serially connected successive substantially rectangular convolutions as indicated at 68 and terminating at the termination point 69. After laying cord reinforcing means 66 of sufficient length to form the desired restrictive tread component, the layed material is then folded, for example, like the covers of a book, on the lengthwise median axis A—A from right to left as viewed in FIGURE 10 to form a first or inner ply 70 and a second or outer ply 72 shown in diagrammatically exploded relation in FIGURE 11. It will be understood that if desired the layed material could be folded on the axis A—A in the other direction, that is from left to right to provide reversely arranged outer and inner plies. As seen, however, in FIGURE 11, the inner ply 70 comprises a plurality of parallel and uniformly spaced apart first leg portions 73 extending transversely of the tread component, and a plurality of parallel and uniformly spaced apart second leg portions 74 continuous with the first leg portions 73 and extending transversely of the tread component at a different and greater diagonal angle than the first leg portions 73. The second or outer ply 72 comprises a plurality of parallel and uniformly spaced apart third leg portions 75 continuous with the second leg portions 74 and at a different angle (substantially normal with respect to the side edges of component 65) than and in crossing relation with the first and second leg portions of the first or inner ply, and a plurality of parallel and uniformly spaced apart fourth leg portions 76 extending at a different angle than and in diagonal transverse relation with respect to the third leg portions 75. Upon folding of the layed cord reinforcing means 66 as above described, the layed material is then formed into an annulus with the opposite ends in mating relation so as to provide for the uniform spacing of the several leg portions circumferentially of the tread component. From an examination of FIGURE 11 it will be observed that the third leg portions 75 of the second leg portions of the first or inner ply, and a plurality spect to the opposite side edges 78 and 79 of the restrictive tread component, and that the first leg portions 73 of the first or inner ply depart slightly from a normal relationship to the side edges of the component. Also, it will be noted that the second leg portions 74 of the first or inner ply 70 and the fourth leg portions 76 of the second or outer ply 72 extend in crossing relation in opposite diagonal directions. With the layed material 66 formed into annular configuration and assembled between the carcass and tread of a tire the several leg portions are disposed in uniform spaced apart relation circumferentially of the carcass with the leg portions 73 and 75 lying in planes extending substantially radially of the axis of rotation of the tire, and with the leg portions 74 and 76 lying transversely of the carcass and extending generally diagonally in opposite directions and crossing relation circumferentially of the carcass.

Another restrictive tread component of the present invention will now be described in connection with FIGURES 12, 13 and 14 of the drawings. In FIGURES 12 and 13, there is shown in front and rear elevation, respectively, a mandrel 80 having upper and lower notch bars 82 and 83, respectively, extending lengthwise of the upper and lower edges of the mandrel. The notch bars 82 and 83 are shown in their operative or outwardly extended positions at which cord reinforcing means 84 is wound, as below described, to form the restrictive tread component illustrated at 85 in FIGURE 14. The notch bars 82 and 83 are arranged to be disposed inwardly of the upper and lower edges of the body of mandrel 80 to inoperative positions in order to remove the wound cord reinforcing means from the mandrel.

The outer edges of each of the notch bars 82 and 83 are provided with a plurality of lengthwise uniformly spaced apart alternately relatively shallow and deep notches 85 and 86 with the apices of notches 85 and notches 86 in bars 82 and 83, respectively, being in substantially transverse alignment.

With the notch bars 82 and 83 in their operative positions, the cord reinforcing means 84, again formed of any of the aforementioned materials of cords reinforcing means 17, 23 or 66, is wound by anchoring the starting end 88 at 89 at the front face of the mandrel, as seen in FIGURE 12, and positioning it into the shallow notch 85 at the forward end of the upper notch bar 82 and extending the cord reinforcing means from the latter notch to cross the back face of the mandrel, as shown at 90 in FIGURE 13, to a shallow notch 85 in the lower notch bar 83 with the latter shallow notch being in alignment with the second shallow notch 85 of the upper notch bar 82. The cord reinforcing means is then extended across the front face of the mandrel, as seen at 92 in FIGURE 12, diagonally across and toward the rear end of the mandrel to a deep notch 86 in the upper notch bar 83, and from such deep notch again across the rear face of the mandrel, as seen at 93 in FIGURE 13 to the opposite aligned deep notch 86 in the lower notch bar 83, and then diagonally across the front face of the mandrel, as seen at 95 in FIGURE 12, to the next succeeding shallow notch 85 at the forward end of the mandrel with the pattern of the lay of the cord reinforcing means then being continued along the mandrel for a desired length of a restrictive tread component. The layed cord reinforcing means when removed from the mandrel may have the opposite ends thereof disposed in abutting or mating relation and formed into annular configuration to form a restrictive tread component.

Upon laying of the cord reinforcing means 84 in the manner described a restrictive tread component is provided which may be considered as comprising a pair of superimposed plies in which one ply, that is the ply formed at the front face of the mandrel 80 as above described comprising a plurality of first parallel leg portions, as shown at 92 uniformly spaced apart and extending diagonally transversely of the component, and a plurality of circumferentially successive parallel second leg portions, like those shown at 95, extending in uniform spaced apart relation diagonally in the opposite direction to the lay of the first leg portions at 92 and with such first and second leg portions being disposed in crossing relation with respect to each other. Also, a second ply is formed which as viewed from the rear face of the mandrel 80 comprises a plurality of third uniformly spacer apart parallel leg portions conforming to the lay 90 as above described, and a plurality of fourth uniformly spaced apart parallel leg portions, as shown at 93, extending transversely of the tread ply and in crossing relation with respect to the third leg portions with such fourth leg portions being substantially normal to the opposite side edges of the restrictive tread component. The third leg portions deviate slightly from a normal relation with respect to the side edges of the component.

With completion of the laying of the material and the removal from the mandrel as above described and upon forming of the layed material into annular configuration with the opposed ends in abutting relation, there is then provided a restrictive tread component having a first or outer ply comprising uniformly circumferentially spaced apart first and second leg portion extending in opposite directions diagonally of the ply and in crossing relation with respect to each other, and an inner ply comprising third and fourth leg portions lying more normal to the side edges of the ply and in crossing relation with respect to each other. It will be noted that laying of cord reinforcing means as last described that the restrictive tread component in effect is provided with step like side edges.

While there has been shown and described certain preferred embodiments of the invention, it will be understood that various modifications and rearrangements may be made therein without departing from the spirit and scope of the invention.

The invention claimed is:

1. A restrictive tread component for use between the crown of a carcass and tread of a pneumatic tire comprising first and second superposed annular plies defined by continuous cord reinforcing means, said cord means in said first ply lying in a plurality of circumferentially successive first leg portions extending transversely of said crown of said carcass, and in a plurality of circumferentially successive second leg portions extending each from said leg portions, respectively, and transversely of said crown of said carcass and at a different angle than the angle of said first leg portions, and said cord means in said second ply lying in a plurality of circumferentially successive third leg portions extending each from said second leg portions, respectively, and transversely of said crown of said carcass, and in a plurality of circumferentially successive fourth leg portions extending each from said third leg portions, respectively, and transversely of said crown of said carcass at a different angle than the angle of said third leg portions.

2. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending each from said leg portions, respectively, and transversely of said crown of said carcass and at a different angle than the angle of said first leg portions, and said cord means in said second ply lying in a plurality of circumferentially successive parallel third leg portions extending each from said second leg portions, respectively, and transversely of said crown of said carcass, and in a plurality of circumferentially successive parallel fourth leg portions extending each from said third leg portions, respectively, and transversely of said crown of said carcass at a different angle than the angle of said third leg portions.

3. A restrictive tread component for use between the crown of a carcass and tread of a pneumatic tire comprising first and second superposed annular plies defined by continuous cord reinforcing means, said cord means in said first ply lying in a plurality of circumferentially successive first leg portions extending transversely of said crown of said carcass, and in a plurality of circumferentially successive second leg portion extending each from said leg portions, respectively, and transversely of said crown of said carcass and at a different angle than the angle of said first leg portions, said cord means in said second ply lying in a plurality of circumferentially successive third leg portions extending each from said second leg portions, respectively, and transversely of said crown of said carcass, and in a plurality of circumferentially successive fourth leg portions extending each from said third leg portions, respectively, and transversely of said crown of said carcass at a different angle than the angle of said third leg portions, and said first leg portions of said first ply and said third leg portions of said second ply extending in opposite directions of the circumference of said crown of said carcass.

4. A restrictive tread component for use between the crown of a carcass and tread of a pneumatic tire comprising first and second superposed annular plies defined by continuous cord reinforcing means, said cord means in said first ply lying in a plurality of circumferentially succesive parallel first leg portions extending transversely of said crown of said carcass, and in a plurality of circumferentially successive parallel second leg portions extending each from said leg portions, respectively, and transversely of said crown of said carcass and at a different angle than the angle of said first leg portions, said cord means in said second ply lying in a plurality of circumferentially successive parallel third leg portions extending each from said second leg portions, respectively, and transversely of said crown of said carcass and in a plurality of circumferentially successive parallel fourth leg portions extending each from said third leg portions, respectively, and transversely of said crown of said carcass at a different angle than the angle of said third leg portions, and said second leg portions of said first ply having the ends thereof lying laterally inwardly of the ends of said fourth leg portions of said second ply providing a step off between said plies at the edges thereof.

5. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending each from said leg portions, respectively, and transversely of said crown of said carcass and at a different angle than the angle of said first leg portions, said cord means in said second ply lying in a plurality of circumferentially successive parallel third leg portions extending each from said third leg portions, respectively, and transversely of said crown of said carcass, and in a plurality of circumferentially successive parallel fourth leg portions extending each from said third leg portions, respectively, and transversely of said crown of said carcass at a different angle than the angle of said third leg portions, said second leg portions of said first ply having the ends thereof lying laterally inwardly of the ends of said fourth leg portions of said second ply providing a step off between said plies at the edges thereof, and said first leg portions of said first ply and said third leg portions of said second ply extending in opposite directions of the circumference of said crown of said carcass.

6. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending each from said leg portions, respectively, and diagonally transversely of said crown of said carcass, and said cord means in said second ply lying in a plurality of circumferentially successive parallel third leg portions extending each from said second leg portions, respectively, and transversely of said crown of said carcass, and in a plurality of circumferentially successive parallel fourth leg portions extending each from said third leg portions, respectively, and diagonally transversely of said crown of said carcass and in crossing relation with respect to said second leg portions.

7. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending each from said leg portions, respectively, and transversely of said crown of said carcass and at a different angle than the angle of said first leg portions, said cord means in said second ply lying in a plurality of circumferentially successive parallel third leg portions extending each from said second leg portions, respectively, and transversely of said crown of said carcass, and in a plurality of circumferentially successive parallel fourth leg portions extending each from said third leg portions, respectively, and transversely of said crown of said carcass at a different angle than the angle of said third leg portions, and said second leg portions of said first ply and said fourth leg portions of said second ply extending in opposite directions of the circumference of said crown of said carcass.

8. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass and in a plurality of circumferentially successive parallel second leg portions extending each from said leg portions, respectively, and transversely of said crown of said carcass and in crossing relation with respect to said first leg portions, said cord means in said second ply lying in a plurality of circumferentially successive parallel third leg portions extending each from said second leg portions, respectively, and transversely of said crown of said carcass, and in a plurality of circumferentially successive parallel fourth leg portions extending each from said third leg portions, respectively, and transversely of said crown of said carcass and in crossing relation with respect to said third leg portions, and said second leg portions of said first ply and said fourth leg portions of said second ply extending in opposite directions of the circumference of said crown of said carcass.

9. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending transversely of said crown of said carcass and in crossing relation with respect to said first leg portions, said cord means in said second ply lying in a plurality of circumferentially successive parallel third leg portions extending transversely of said crown and in a plurality of circumferentially successive parallel fourth leg portions extending transversely of said crown of said carcass at a different angle than the angle of said third leg portions, said third leg portions of said second ply extending each from said first leg portions, respectively, of said first ply, and said fourth leg portions of said second ply extending each from said second leg portions, respectively, of said first ply.

10. A restrictive tread component for use between the crown of the carcase and tread of a pneumatic tire comprising first and second superposed annular plies defined by continuous cord reinforcing means, said cord means in said first ply lying in a plurality of circumferentially successive parallel first leg portions extending transversely and in one diagonal direction of the circumference of said crown of said carcass, and in plurality of circumferentially successive parallel second leg portions extending transversely and in the other diagonal direction of the circumference of said crown of said carcass, said cord means in second ply lying in a plurality of circumferentially successive parallel third leg portions extending transversely of said crown of said carcass, and in a plurality of circumferentially successive parallel fourth leg portions extending transversely of said crown of said carcass at a different angle than the angle of said third leg portions, and said third leg portions of the second ply extending each from said first leg portions, respectively, of said first ply, and said fourth leg portions of said second ply extending each from said second leg portions, respectively, of said first ply.

11. A restrictive tread component for use between the crown of a carcass and tread of a pneumatic tire comprising first and second superposed annular plies defined by continuous cord reinforcing means, said cord means in said first ply lying in a plurality of circumferentially successive parallel first leg portions extending transversely of said crown of said carcass, and in a plurality of circumferentially successive parallel second leg portions extending transversely of said crown of said carcass and in crossing relation with said first leg portions, said cord means in said second ply lying in a plurality of circumferentially successive parallel third leg portions extending transversely of said crown of said carcass, and in a plurality of circumferentially successive parallel fourth leg portions extending transversely of said crown of said carcass and in crossing relation with said third leg portions, said third leg portions of said second ply extending each from said first leg portions, respectively, of said first ply, and said fourth leg portions of said second ply extending each from said second leg portions, respectively, of said first ply.

References Cited by the Examiner

UNITED STATES PATENTS

| | | | |
|---|---|---|---|
| 2,947,339 | 8/1960 | Billingsley | 152—361 |
| 3,024,828 | 3/1962 | Smith et al. | 152—354 |
| 3,231,000 | 1/1966 | Massoubre | 152—361 |

FOREIGN PATENTS

| | | |
|---|---|---|
| 779,159 | 7/1957 | Great Britain. |

ARTHUR L. LA POINT, *Primary Examiner.*

C. W. HAEFELE, *Assistant Examiner.*